Patented Jan. 6, 1925.

1,522,410

UNITED STATES PATENT OFFICE.

MAURICE M. BLUHM AND HERMAN THEAMAN, OF NEW YORK, N. Y.

DENTIFRICE.

No Drawing.     Application filed March 5, 1924. Serial No. 696,949.

*To all whom it may concern:*

Be it known that we, MAURICE M. BLUHM and HERMAN THEAMAN, each a citizen of the United States, residing at New York city, county of New York, and State of New York, have invented certain new and useful Improvements in Dentifrices, of which the following is a specification.

This invention relates to dentifrices and more particularly to a new compound having an inert pulverized, vegetable fiber as its base, possessing the necessary cleansing and polishing efficiency required in a tooth paste.

Among the most widely used bases in dentifrices may be found calicum phosphate, chalk, pumice and other well known minerals which have the properties of acting as an abrasive or cleanser but many compounds containing these ingredients are gritty, have the tendency to scratch and injure the enamel and gums. In many instances, the condition of the teeth and gums will not permit the use of a dentifrice containing a gritty substance or one tending to scratch the enamel with the result that liquid preparations are resorted to with somewhat limited success. Our invention, therefore is to overcome the above objections by compounding a detifrice that will be highly efficient under all conditions, agreeable to use, and particularly adapted for children as well as adults.

After considerable experiment, we have found that a pulverized, structural, vegetable fiber and particularly soft wood, such as the willow, is most suitable as a base for a tooth paste or cream. When finely pulverized so that the vegetable fiber will pass through a 180 to 200 mesh screen, it possesses great polishing efficiency. The fiber particles being very fine and soft cannot scratch or injure the enamel, yet have sufficient abrasive characteristics to remove the film from the teeth and gums.

Another quality incident to the use of structural, pulverized vegetable fiber is the consistency given to the cream when compounded with a flavoring extract or with a fruit flavor and fruit acid, such as fruit pulps having the properties of a binder. It has been found that when the pulverized, structural fiber is immersed in water until the particles swell to their maximum capacity absorption of the fruit acid takes place and helps to prolong the distribution of the acid over the teeth when the cream is used on the tooth brush in the mouth. The fruit pulp or acid used, should not give the paste a higher acidity than that of fruit juices. A suitable proportion of vegetable gum or glycerine may be added to act as a binder and preservative, if desired, in componding the dentifrice.

A further advantageous result in using a structural, as opposed to a non-structural, pulverized, vegetable fiber as the base of our dentifrice is that it does not combine with any neutralizing effect, such as powdered chalk would have, with the acid or any other ingredient. Moreover, it is essentially inert chemically and does not participate in disturbing reactions in the compound after its mixture so that it can be safely stored for a considerable length of time prior to use without the addition of preservatives.

We believe ourselves to be the first to adopt and use a structural pulverized, vegetable fiber base for a dentifrice and particularly paste, as contradistinguished from non-structural bases, mineral abrasives and other substances having gritty properties as above set forth.

Having described our invention what we now claim as new and desire to secure by Letters Patent of the United States, is:—

1. A dentifrice consisting of a structural pulverized, vegetable fiber and a fruit pulp.

2. A dentifrice consisting of a structural pulverized, vegetable fiber and a fruit acid.

3. A dentifrice consisting of a structural pulverized vegetable fiber and a fruit acid imparting less acidity than that of the fruit.

4. A dentifrice consisting of a structural pulverized, vegetable fiber, a fruit acid and a fruit flavor.

5. A dentifrice consisting of a structural pulverized vegetable fiber, a fruit acid, and glycerine.

6. A dentifrice consisting of a structural pulverized wood fiber, a fruit ac:d, a fruit flavor and glycerine.

7. A dentifrice consisting of a structural pulverized wood fiber, a fruit acid, a fruit flavor, glycerine and a preservative against fermentation of the paste itself.

In testimony whereof we affix our signatures this 1st day of March 1924.

MAURICE M. BLUHM.
HERMAN THEAMAN.